United States Patent [19]

Keeran

[11] 4,100,544
[45] Jul. 11, 1978

[54] BEACON SYSTEM EMPLOYING RAMPED GAIN RECEIVER

[75] Inventor: Royal V. Keeran, Upland, Calif.

[73] Assignee: General Dynamics Corporation, Pomona, Calif.

[21] Appl. No.: 818,376

[22] Filed: Jul. 25, 1977

[51] Int. Cl.$^2$ .......................... G01S 3/32; G01S 9/22
[52] U.S. Cl. ............................ 343/6.5 R; 343/16 M; 343/100 LE
[58] Field of Search .............. 343/16 M, 119, 100 LE, 343/6.5 R

[56] References Cited

U.S. PATENT DOCUMENTS

| 2,026,254 | 12/1935 | Sandfort | 343/119 |
| 3,942,181 | 3/1976 | Berrod et al. | 343/16 M |
| 4,023,172 | 5/1977 | Schmidt | 343/100 LE X |

*Primary Examiner*—Maynard R. Wilbur
*Assistant Examiner*—Richard E. Berger

*Attorney, Agent, or Firm*—John E. Wagner; Edward B. Johnson

[57] ABSTRACT

A beacon receiver or IFF system in which the gain of the receiver is time varied to enhance the discrimination between response from transponders located ahead of the interrogator as compared with the responses from transponders in the side or rear lobe regions of the interrogator antenna pattern. The system is employed with a directional antenna and signal processing apparatus giving sum Σ and difference Δ channels. In accordance with this invention, the gain of the receiver in the sum Σ channel is increased from the minimum value to a maximum value beginning after the end of interrogation pulse. The difference Δ channel is varied in gain from the time in the beginning after the end of the interrogator pulse but the gain is varied inversely from the maximum level at the beginning of reception to a maximum level at the end of reception.

6 Claims, 11 Drawing Figures

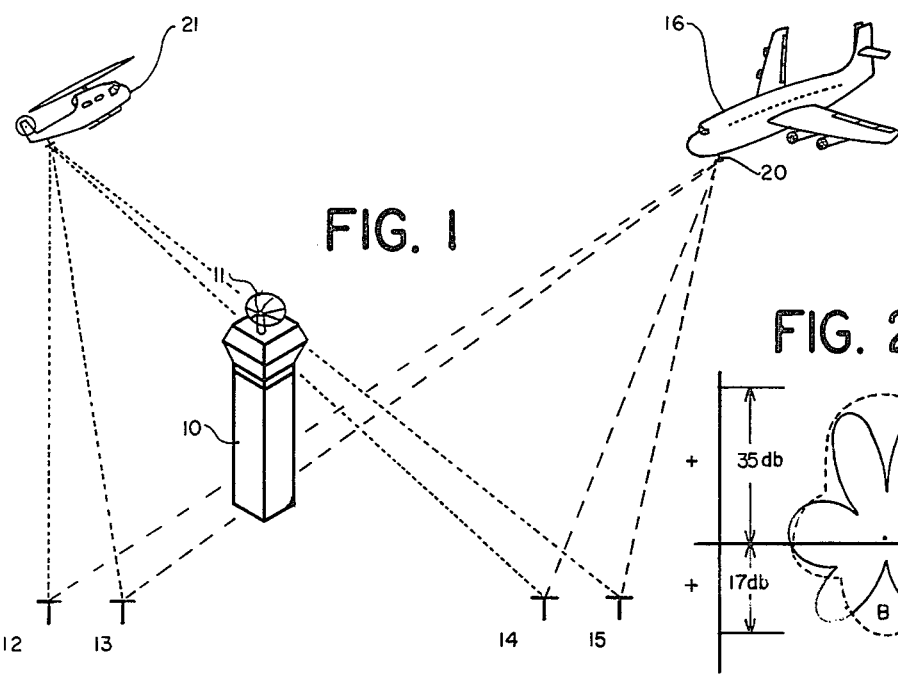
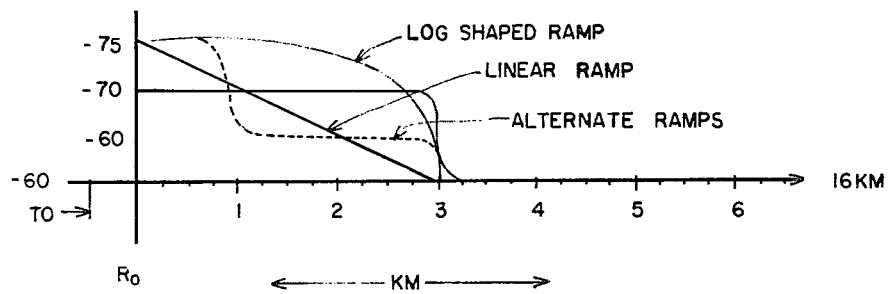
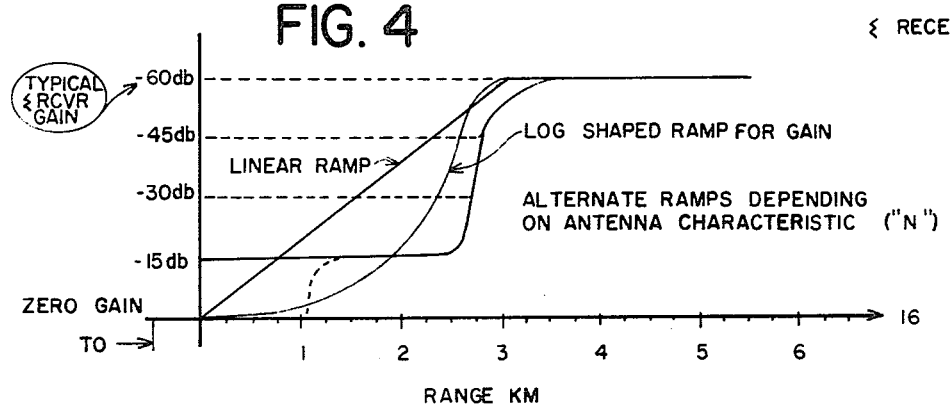

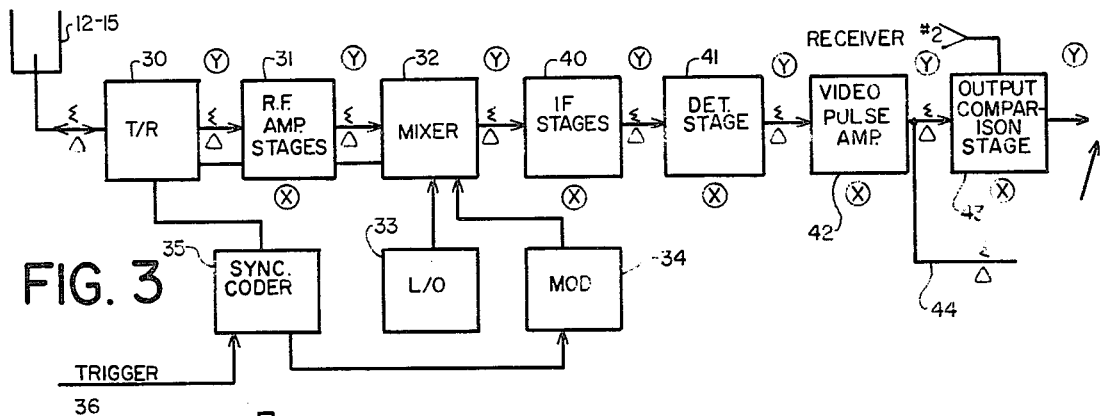
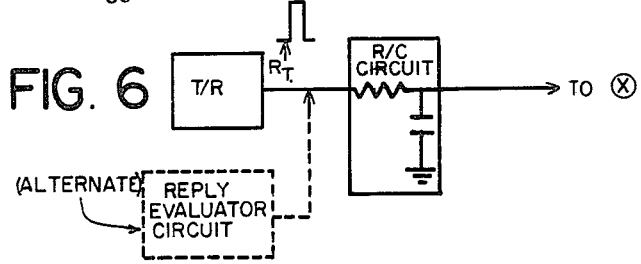
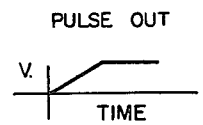
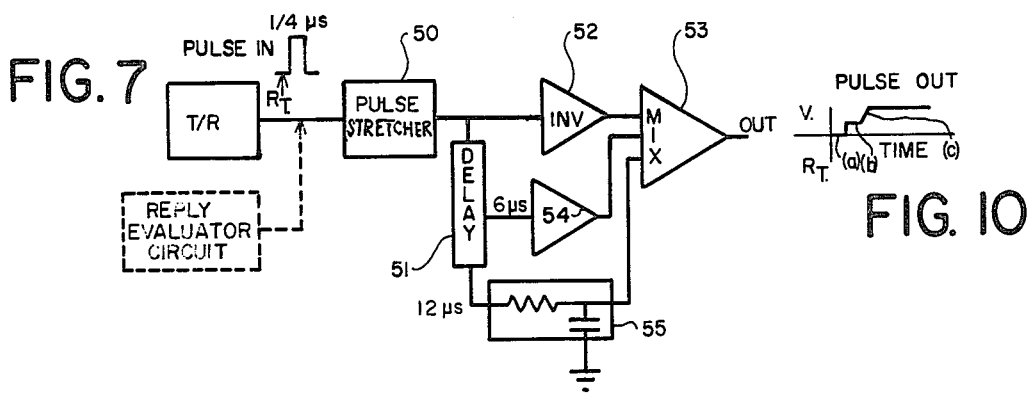
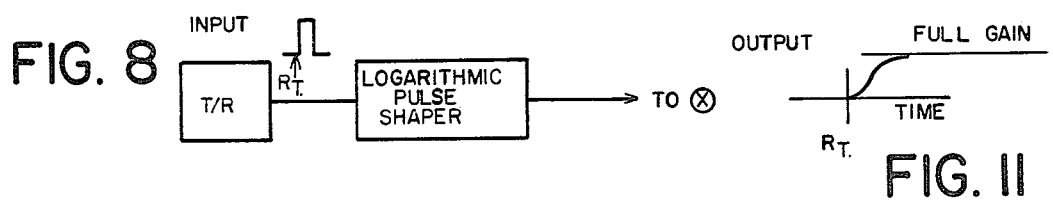

BEACON SYSTEM EMPLOYING RAMPED GAIN RECEIVER

The invention herein described was made in the course of or under contract or sub-contract thereunder with the Department of the Army.

BACKGROUND OF THE INVENTION

Heretofore the discrimination between wanted and unwanted returns in beacon interrogator-transponder and IFF (identification friend and foe) systems has been one of major concern. In either the air traffic identification and control situation or in the combat situation, interrogation pulses are directed towards one particular aircraft to which its transponder will respond to obtain a reliable identification. This wanted aircraft will be in the particular sector of interest and may be at a maximum range. Other aircraft at closer ranges in the side or rear lobes of the radiation pattern of the interrogator antenna may respond which can produce ambiguities and actually produce a false return.

The most general approach has been to improve the directivity of antennas and to suppress their side and rear lobes. Within the present state of the antenna art, the complete suppression of unwanted returns employing improved antenna directivity alone is not economically practical. There have been attempts to solve the problem via electronic means in the interrogator-receiver. A principal example of such electronic systems is disclosed in U.S. Pat. No. 2,962,713 to K. E. Harris et al in which the interrogator-receiver is gated and a complex dual interlaced trains of interrogation pulses are used. The interrogation pulses are of different level. Discrimination is obtained on the basis of return from the higher intensity pulse train as distinguished from the low intensity train.

Another approach to electronic discrimination is disclosed in U.S. Pat. No. 2,594,916 to H. D. Gulnac. This patent discloses an automatic gain control circuit which serves to control the level of the receivers as a function of the azimuth sweep. Another approach to side lobe suppression in interrogator-transponder systems is disclosed in U.S. Pat. No. 2,966,675 to A. E. Smoll. In accordance with the teaching of this patent, a second antenna having a different radiation pattern than the interrogator-receiver antenna is used and reference pulses are transmitted via the second antenna. Discrimination against side lobe return is achieved by comparison of the reference pulses with the return from the primary interrogation pulses. U.S. Pat. No. 3,122,737 to M. Setrin and 2,741,759 to C. V. Parker employ dual antennas at the interrogator and dual transmitters with discrimination between wanted and unwanted returns on the basis of the dissimilar antenna patterns and dissimilar pulse trains.

In conventional search, naval and some ground based radar systems, gain variation in the receiver known as sensitivity time control has been used in which the gain of the radar receiver is lowered immediately following transmission and increased steadily at the time when the sea return has disappeared. Such circuits are mentioned in the M.I.T. Radiation Laboratories Series, published in 1964 by Boston Technical Publishers, Inc., in Section 12-8 on page 460.

BRIEF STATEMENT OF THE INVENTION

Given the foregoing state of the prior art, I have developed an improved interrogation-transponder system which does not require additional antennas or transmitters nor does it require complex or dual pulse trains to obtain improved discrimination against unwanted side and back lobe returns, commonly called "punch through."

My invention involves controlling the gain of the interrogator receivers in accordance with a time varying relationship. It is employed on conventional dual receiver systems which derive the sum $\Sigma$ and difference $\Delta$ compondents of the transponder return for tracking the accurate detection of the return signal. Such systems are described in Skolnik, *RADAR HANDBOOK*, copyright 1970, McGraw-Hill, Inc., New York, N.Y. in chapter 38.

In accordance with my invention the gain of the sum $\Sigma$ and difference $\Delta$ receivers are controlled in gain starting at the receiving time $R°$ and extending to just beyond the time normal transponder responses in any direction other than in the forward direction, i.e. primarily rearward, could be otherwise received. In the preferred embodiment, the gain of the sum $\Sigma$ receiver is increased logarithmically from a minimum value immediately following termination of the interrogation pulses to a full gain steady state level at a time corresponding to the maximum range of concern of side or back lobe return plus a margin. The difference $\Delta$ receiver gain is decreased from the beginning of pulse reception $R°$ logarithmically until a minimum gain level is reached at a time period or range corresponding to that of the steady state value of the sum receiver gain.

In an alternate embodiment, the gain is varied inversely linearly or along non-linear but inverse time-gain curves.

BRIEF DESCRIPTION OF THE DRAWING

The above features of this invention may be more clearly understood by the following detailed description and by reference to the drawing in which:

FIG. 1 is a block diagram of a beacon interrogator-receiver in accordance with this invention;

FIG. 2 is a graphical representation of the antenna patterns of the ground station of FIG. 1;

FIG. 3 is a block diagram of a typical ground station receiver employing this invention;

FIG. 4 is a graphical representation of the gain characteristics of the ground station sum receiver employing this invention;

FIG. 5 is a graphical representation of the gain characteristics of the ground station difference receiver employing this invention;

FIGS. 6, 7 and 8 are simplified fragmentary block diagrams showing typical gain shaping circuits employed in combination with the circuit of FIG. 3; and FIGS. 9, 10 and 11 are respective graphical representation of the gain-time characteristics of each of the circuits of FIGS. 6, 7 and 8.

DETAILED DESCRIPTION OF THE INVENTION

FIG. 1 shows a typical tactical situation which appears at almost every major airport on a daily basis. An aircraft controller located, for example, in a control tower 10, has available a primary radar system represented by antenna 11 as well as a secondary or interrogator-responder system employing an array made up of antennas 12-15, for example through which interrogation signals are radiated and transponder returns are received. The radar antenna 11 is swept in aximuth and as shown is illuminating aircraft 16 which will appear as a dot on a PPI (plan position indicator) display for the air traffic controller. When aircraft 16, as shown in FIG. 1, is equiped with a transponder as indicated by its omnidirectional antenna 20, coded responses by the aircraft 16 will be detected in the secondary radar system and the decoded aircraft identification and altitude represented on the PPI display adjacent to the primary radar return dot for use by the air traffic controller.

Despite the fact that the primary radar and this secondary system are highly directional, responses from other aircraft in the area such as helicopter 21 may be detected and meet all the criteria for a valid return from aircraft 16 which would result in a serious error in presentation of information to the air traffic controller. The result of such error could be disasterous. The causes of such an impossible situation are:

(1) the need for omnidirectional antennas on aircraft whereby all aircraft within range of the interrogator receive the interrogation transmission;

(2) automatic response to all interrogations by such aircraft; and (3) less than perfect azimuth discrimination of the interrogators receiving antenna system.

Employing sum and difference signal processing of the return signals from an antenna array such as antennas 12–15, a pattern as shown in FIG. 2 is developed. It consists of a sum Σ pattern having a main lobe having a beam width as desired by typically 30° and having side lobes "S" and back lobe "B". Typically, the main lobe has a forward gain of that approximately equal to a Standard Optimum Horn (SoH) and a rear gain of −7db relative to a Standard Optimum Horn. The difference Δ pattern shows a pair of main lobes in the front direction with a typically 30 db null on the axis a of the sum Σ channel pattern. The gain of the difference channels Δ approximate that of the sum channel on the front, side and rear directions. The sum and difference patterns are well known and illustrated by Skolnick, supra on page 38-10 in FIG. 6.

Employing the antenna system of FIG. 1 having patterns similar to FIG. 2, a valid return is determined by a series of criteria, the first of which is affected by this invention.

A basic criteria is $$\Sigma > \Delta \text{ by } X \text{ db} \qquad (1)$$

x may be in the order of 15. When this basic criteria is met, signal decoding analysis and display proceeds. Unfortunately, a nearly off axis target such as a helicopter 21 can respond to an interrogation pulse and its response denoted by the dash-dot lines, is received by the side or back lobes of the antenna system 12–15 thus simulating a return from aircraft 16. If aircraft 16 has failed to respond or his response mistaken for the return from the helicopter the air traffic controller may give erroneous instructions to aircraft 16. If this were a military combat situation and the system used for identification friend vs. foe (IFF) such an error could likewise produce fatal results.

In order to understand how this invention virtually eliminates such spurious responses from meeting the basic criteria of equation (1) above, an understanding of the basic interrogator-receiver system is required. It is illustrated in simplified form in FIG. 3. Antenna 12–15 is connected via a transmit/receive (TR) switch 30, RF amplifier stage 31 to mixer 32. The mixer 32 mixes the output of a local oscillator 33 with the transmitted code out of a modulator 34 under the control of a synchronizer-coder 35.

The synchronizer-coder 35 itself is enabled by an external triggering input over lead 36 and it controls the switching of T/R switch 30 between its transmit and receive modes. Interrogation pulses originating at the synchronizer coder 35 pass through the modulator 34, mixer 32, RF amplifier 31, TR switch 30 to antenna array 12–15. Received responses arriving at antennas 12–15 are processed typically at the antenna 12–15 and the sum and difference values derived. These signals are RF amplified in amplifier 31, converted to the final IF frequency by mixer 32 and thereafter down converted in IF stages 40 prior to detection in stage 41, and then to video amplifier 42. This is the block diagram of a typical classical superheterodyne receiver. This output of a similar receiver in comparison stage 43 or processed directly on lead 44.

Employing this invention, the gain of the receiving channel of the interrogation-receiver is ramped or varied as a function of time. The sum Σ channel and difference Δ channel gains are ramped inversely beginning at a time R° or received time zero. The gain time curves are selected as a function of the antenna patterns which in turn depend upon the type, size and placement of the receiving antennas.

The simplest form of gain ramping for the sum Σ receiver is to increase the gain of −60db linearly over a period of approximately 18(+) microseconds, corresponding to a range of 3 kilometers and then to maintain the gain at a maximum level. At the same time the difference Δ receiver gain is varied from a maximum gain initially in the order of −75db to a minimum level −60db at the end of the same initial period, e.g. 18 (+) microseconds. The gain of the difference receiver is thereafter maintained at the minimum level throughout the remainder of the interrogation-response cycle.

In addition to the linear ramp, logatirhmic ramps may be used or more complex waveforms may be used. Gain control can be applied at the RF amplifier stage 31, IF stage 40 or after detection in the video amplifier state 42. Additionally an internal amplifier or gain control may be introduced after the normal video output but before the comparison stage 43.

The implementation of this invention may be carried out in several ways. Already the receiver is normally disabled during the transmit cycle. In certain systems employing sensitivity time control, there is partial gain suppression for a fixed time. Employing this invention, controlled timed recovery may be achieved by employing a pulse control in which the return pulses are passed through a simple RC circuit as shown in FIG. 6, which is used to generate a reasonably linear ramp voltage appearing in FIG. 9. The linear ramp voltage is applied to one or more of the points "X" of FIG. 3. The linear ramp is applied to:

(a) increase the gain of the sum Σ channel while (b) decreasing the gain of the difference Δ channel. A typical RC circuit employs a value of resistance "R" of 1 megohm and a capacitor of value of 20 μμ fd. which produces a recovery time of 18 to 24 micro-seconds.

In an alternate embodiment as shown in FIG. 7, a pulse shaper circuit is triggered by the T/R switch 30 of FIG. 3 at receiver time R° to form a ramp shape to hold gain low for a time period (a), e.g. 6Ms. and then constant for a second time period (*b*) such as 6 Ms., and then linearly (*c*) to recover to normal. The curve generated appears in FIG. 10. A suitable circuit to generate the curve of FIG. 10 is made up of a pulse stretcher 50 extending a ¼ Ms. pulse to 6 Ms. feeding a center tapped 12 Ms. delay line 51. The output of the pulse stretcher 50 is inverted in inverting amplifier 52 and combined in a mixing amplifier 53 with 6 Ms. delayed pulse passed through a clipping amplifier 54 and the 12 Ms. delayed pulse passed through an RC circuit 55. The output of the mixer amplifier 53 is the wave form of FIG. 10.

As shown in FIG. 3, the symbol ⊖ denotes points in the receiver at which gating or gain control circuits may be inserted between stages instead of controlling existing stages at points "X". In such case, these circuits will respond directly to incoming pulses and do not require external control as described above at points "X".

The above described embodiments of this invention are merely descriptive of its principles and are not to be considered limiting. The scope of this invention instead shall be determined from the scope of the following claims including their equivalents.

What is claimed is:

1. In an interrogator-transponder system including a transmitting and receiving antenna system,
    a pulse transmitter;
    a pulse receiver;
    transmit-receive switch for selectively connecting the antenna system to the transmitter and the pulse receiver in which the pulse receiver responds to return pulses from a transponder on a remote vehicle which transponder reacts to interrogator pulses from the pulse transmitter in which the antenna system includes a plurality of antennas from which the sum and difference components of the receive signals from the transponder are derived and in which the receiver processes the sum $\Sigma$ and difference $\Delta$ signals in part and in two different channels and in which the receiver includes means for comparing the level of the sum $\Sigma$ channel with respect to the difference $\Delta$ channel;
    the improvement comprising means for simultaneously varying the gain of the receiver sum $\Sigma$ signal channel inversely with respect to the receiver difference $\Delta$ signal channel.

2. The combination in accordance with claim 1 wherein said gain varying means serves to vary the receiver sum $\Sigma$ channel gain from the minimum level to a maximum level while varying the difference $\Delta$ channel gain from a maximum to a minimum level.

3. The combination in accordance with claim 1 wherein said gain varying means is operative beginning at a time R° related to the first receipt of return from a transponder.

4. The combination in accordance with claim 1 wherein said gain varying means varies the gain of the sum $\Sigma$ and difference $\Delta$ channels linearly.

5. The combination in accordance with claim 1 wherein said gain varying means varies the gain of the sum $\Sigma$ and difference $\Delta$ portions logarithmically.

6. The combination in accordance with claim 1 wherein said gain varying means comprises an integrating circuit and means applying a pulse to said integrating circuit and means for controlling the level of gain as a function of the integrated pulse at said integrator.

* * * * *